Patented Feb. 16, 1943

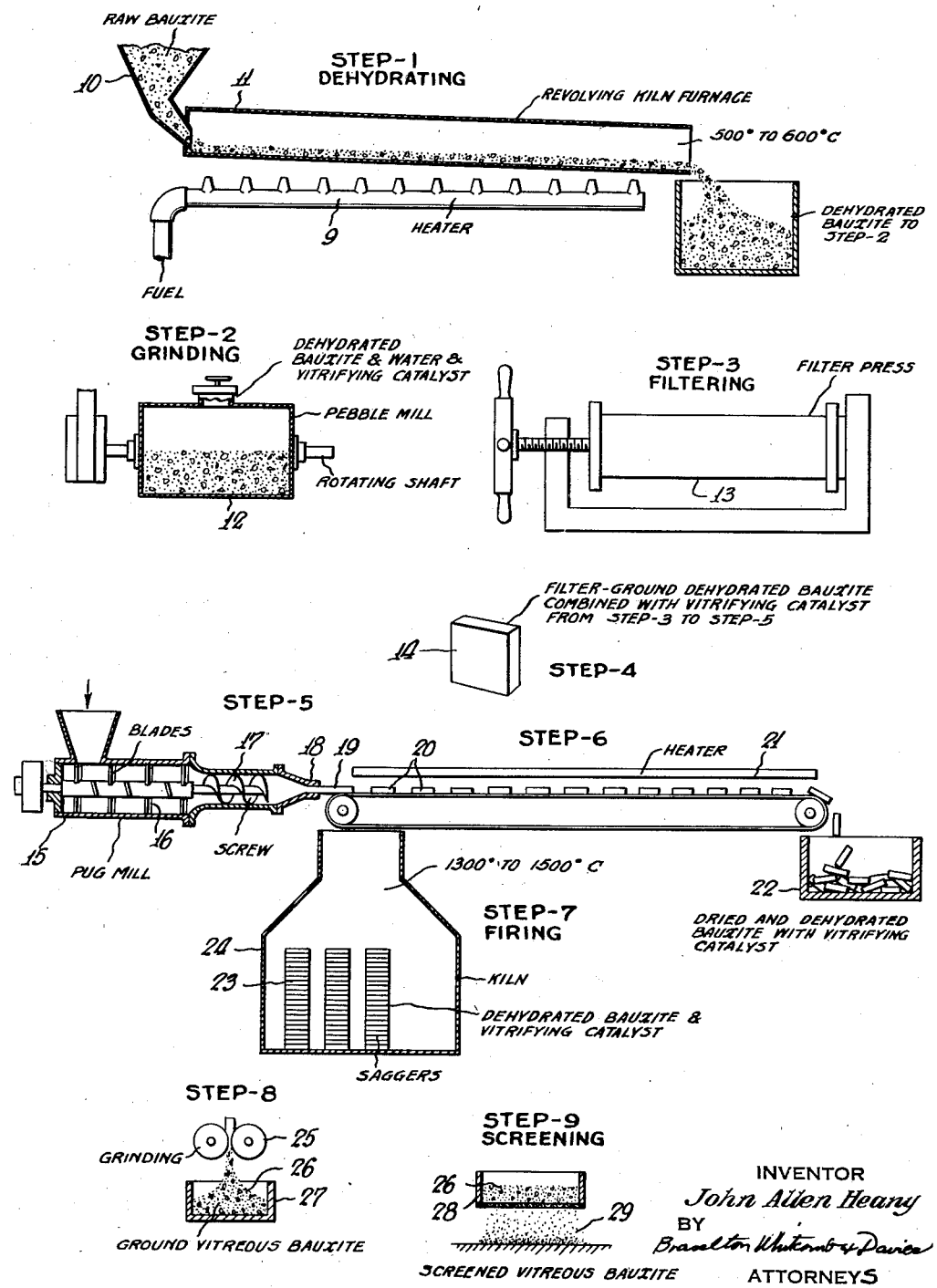

2,310,953

UNITED STATES PATENT OFFICE 2,310,953

CERAMIC FROM BAUXITE AND PROCESS OF MAKING SAME

John Allen Heany, New Haven, Conn., assignor to Heany Industrial Ceramic Corporation, Rochester, N. Y.

Application June 29, 1936, Serial No. 87,825

9 Claims. (Cl. 106—62)

The present invention relates to making ceramic materials from bauxite and it particularly relates to processes of preparing hard, dense and amorphous refractories from bauxite without fusion.

Bauxites, as they occur in nature, contain substantial quantities of iron, titanium and silicon oxides. It has been found that these oxides tend to act as negative catalysts in preventing the formation of satisfactory ceramics from bauxite. Although bauxite is readily available in large quantities, considerable difficulty has been experienced in forming suitable ceramic materials which may be utilized for abrasives, refractory bricks, crucibles, pipe stems, nozzle tips and so forth, and it has usually been necessary to resort to fusion processes, which latter not only necessitate the use of electric furnace equipment, but in addition result in the formation of crystalline products which have cleavage planes and which are not suitable for many purposes. Moreover, if the usual ceramic methods are applied to the production of articles from bauxite, it is found that the final ceramic materials are usually not vitreous, do not appear to be homogeneous, and often are quite porous.

It is among the objects of the present invention to produce ceramic articles from natural mineral bauxite which are hard, amorphous, dense, homogeneous, vitric-like, non-porous and which may be widely utilized for many ceramic purposes and which may be readily and inexpensively manufactured without the necessity of resorting to expensive fusion processes.

Other objects will become obvious during the course of the following specification.

According to the present invention it has been found possible to produce hard, vitric-like, homogeneous, non-porous and amorphous ceramic articles useful for many purposes by heating dehydrated bauxite which has been finely ground and formed at a bright yellow heat or a temperature of between 1000° C. and 1500° C. or between about cones 13 and 18 in the presence of relatively small quantities of magnesium oxide or a magnesium compound, excluding preferably the magnesium silicates, such as steatite and talc. The magnesium compound, and preferably the magnesium oxide compound, should be utilized in proportions of less than 10% and preferably about or less than 5%, the most suitable proportions found to be between ½% and 3%. The magnesium compound or oxide does not seem to function as a flux or combining agent with the alumina, but its function appears to accelerate and catalyze the formation of a vitreous alumina at a relatively low firing temperature of 1300° C. to 1500° C., substantially below the fusion point of alumina even in the presence of silica and iron and titanium oxides.

The firing treatment should be so controlled as to temperature and time that the bauxite fully retains its amorphous character in its final ceramic form. Before firing, it is usually preferable to drive off all—or nearly all—of the water and volatile matter in the bauxite. This may be accomplished by heating the bauxite to a red heat or to between 500° C. and 600° C. The bauxite, before and/or after dehydration, may be ground or disintegrated to a fine powder, preferably of a fineness of 250 mesh or finer.

Many different types of hydrous alumina or bauxite may be employed. The following are examples of two representative bauxites which are found in the United States:

| Alabama | | Arkansas | |
|---|---|---|---|
| | Per cent | | Per cent |
| $Al_2O_3$ | 57 | $Al_2O_3$ | 58 |
| $Fe_2O_3$ | 0.5 | $Fe_2O_3$ | 4 |
| $SiO_2$ | 11 to 12 | $SiO_2$ | 5 to 6 |
| $TiO_2$ | 2.5 to 3 | $TiO_2$ | 3 to 3.5 |
| Ignition loss | 29 to 30 | Ignition loss | 30 |

The bauxite should usually contain less than 5% silica if the hardest types of ceramics, such as nozzles or dies, are to be produced. With higher quantities of silica or iron or titanium oxides than above, a softer or less tough ceramic or refractory will be obtained.

The dehydrated, amorphous bauxites may then be mixed with water and the magnesium compound to form a plastic or dough-like mass, which is formed into articles and then fired to a temperature below the fusion point of bauxite or aluminum oxide, preferably to a bright yellow heat or to a temperature ranging from 1000° C. to 1600° C., or more desirably from 1350° C. to 1450° C. To express this temperature in cones— the preferred range is between cones 13 and 18. This temperature is maintained until the finely divided material has conglomerated to form a dense, hard, non-porous and vitric-like mass, which is amorphous and void of cleavage planes, and which has a conchoidal fracture.

Although magnesium oxide or hydroxide is a preferred form of the magnesium compound, it is also possible to utilize magnesium borate, magnesium chloride, magnesium sulphate, or magnesium carbonate. In some respects, where it is not desired to obtain as hard a refractory as finally results from the above described process, the magnesium may be used in part in the form of a silicate, such as steatite or talc. It has also been found satisfactory additionally to incorporate a small amount of an alkali metal compound, preferably of water soluble nature with the finely powdered dehydrated bauxite, or an alumina, the preferred alkali metal compounds being sodium or potassium nitrates, borates, nitrites, chlorides, sulphates, acetates, formates, and to a lesser degree, the silicates.

The magnesium compound, with or without the alkali metal compound, particularly when it is utilized in proportions less than 10%, or less than 5%, appears to overcome the negative effect of the titanium, silicon and iron oxides which appear to retard production of a satisfactory ceramic material.

The alkali metal compound, when it is used, should not be employed in amounts greater than 3% to 5%, and it may be used in amounts substantially less than 1%, or even in as small amounts as 0.01% to 0.1%.

Where the magnesium compound, with or without the alkali metal compound, is combined with the dehydrated bauxite in the wet, it is desirable to dry the material either before or after forming and molding it, to remove the excess water.

Where there are substantial amounts of volatile salts such as the carbonates, sulphates, nitrates or nitrites, it is also sometimes desirable to first heat the formed or molded material to a temperature below the final firing temperature to decrease any possible shrinkage or formation of bubbles or gases during the final firing operation.

To enhance the quality of the final ceramic, it is also desirable that the dehydrated bauxite compound with the magnesium oxide, and with or without the alkali metal compound, be pugged and treated in such a manner before molding or forming, as by application of vacuum or pressure, to draw the air and gases out of the mixture. It is to be understood that the dehydrated and finely divided alumina may also be combined in dry condition with the magnesium compound and with the alkali metal compound. However, wet incorporation, brought about by grinding together of the dehydrated bauxite and the magnesium and/or alkali metal compound in the presence of 1% to 25% water has been found to be more satisfactory, since it eliminates the possibility of creating static charges and assists incorporation of the magnesium and alkali metal compounds. In this wet mixing operation from 2% to 10% of the water may be added, the preferred quantity being about 4%. After the grinding together of the bauxite and catalytic material has been completed, the mass may be filter pressed to remove all excess moisture, dried, dehydrated and ground. Following grinding, the mixture may be pressed, formed or molded to the shape of ceramic articles which it is desired to produce.

If desired, some of the catalytic material may also be added to the initial bauxite before dehydration, and this may be done incidental to a wet or dry grinding of the bauxite before its initial dehydration.

It has also been found desirable in many instances where a catalyst is to be added, such as a magnesium compound, to add the catalyst in two stages, part of the catalyst being added by wet or dry grinding before or after dehydration, and the remainder of the catalyst being added after the initial mixture has been completed. Where the magnesium compound is to be combined with an alkali, it is often found desirable to incorporate the alkali metal compound in a subsequent step of wet grinding after the magnesium compound has been thoroughly intermingled with the finely divided bauxite, the bauxite being in hydrated or dehydrated condition.

It is also possible to add part or all of the catalytic material, whether it be a magnesium compound with or without an alkali metal compound, to the alumina material after it has been fired to a relatively elevated temperature. For example, the alumina material may have been fired at a temperature of 1000° C. to 1200° C., or even up to a temperature of 1400° C. to 1600° C. for a sufficient time to modify the alumina without causing vitrification and with or without the addition of a part of the magnesium compound and an alkali metal compound. The ceramic materials so formed may then be ground wet or dry, combined in one or several steps with the catalytic material, following which the mass may be formed to a desirable shape and then fired at a temperature of 1400° C. to 1600° C. until the desired ceramic characteristics are attained.

As an alternative method of incorporating a catalytic reagent, the alumina article may be formed and heated sufficiently so that it will hold its shape without complete vitrification, as for example, by firing it to a temperature of 1000° C. to 1300° C. or higher. This article may then be dipped into an aqueous or non-aqueous solution or suspension of the magnesium compound and/or of the alkali metal compound, or such suspension or solution may be sprayed upon the aluminous material.

Several examples of the different proportions which may be employed and of the results corresponding thereto are as follows:

1. A mixture of 95% dehydrated Arkansas bauxite and 5% magnesium oxide will give a ceramic testing Rockwell 66C. Where the firing is carried out in an oxidizing atmosphere the Rockwell test is about 72C, while in a reducing atmosphere the Rockwell test is about 70C.

2. A mixture of 97% dehydrated Arkansas bauxite, plus 2% magnesium oxide, plus 1% potassium nitrate, will give a ceramic of hardness Rockwell 69C.

3. A mixture of 94% dehydrated Arkansas bauxite, plus 5% magnesium oxide, plus 1% potassium nitrate will give Rockwell test of 74C. With Alabama bauxite instead of Arkansas bauxite, the Rockwell test is 62C.

4. A mixture of 93% dehydrated Arkansas bauxite, plus 5% magnesium oxide, plus 2% sodium borate ($Na_2B_4O_7$) will give a Rockwell test of 68½C, while 98% Arkansas bauxite, plus 2% sodium borate will give a Rockwell test of 65½C.

In these examples the magnesium and alkali metal compounds are incorporated by wet grinding with the dehydrated bauxite and the mixture fired at 1450° C. to 1500° C. for three to five hours at maximum heat.

By using the present methods of preparing aluminous ceramics it is possible to avoid the use of the electric arc furnaces, which produce a fused and crystalline ingot or mass which must then be ground, mixed with bonding material such as clay, formed into the shape of the article and finally fired in a kiln.

In the present process the natural bauxite may be directly formed into the ceramic article in ordinary fuel-fired furnaces or kilns, as now used in firing porcelain or other ceramics, at temperatures below the fusion point of bauxite. As a result the ceramics are produced at low cost with large unit production and the final alumina ceramic is amorphous rather than crystalline. Moreover, the alumina, being in a relatively pure condition devoid of bonding clays, is very dense and vitreous, and it has been found that the density increases with the fineness of the grinding of the initial alumina material before or after hydration. The shrinkage of the ceramic is very slight, being less than 15% to 20%, so that the articles may be directly formed in the final shape.

The final ceramic materials produced may be utilized for stoneware, refractory bricks, abrasives, nozzles for sand blasting, dies for wire drawing, crucibles, refractory vessels, tubing, translucent panels, pyrometer tubes, dies, furnace linings, muffles, combustion tubes, tiles, combustion boats, pebbles for pebble mills, non-slip treads, mortars and pestles, casseroles, spatulas, hearth plates, saggers, jaws for crushing apparatus, drills, chemical stoneware, pottery, textile guides, electric furnace cores, bearings for clocks and instruments, linings for ball and pebble mills, and so forth.

It is an essential feature of the present invention that a natural bauxite, with its normal content of iron oxide, titanium oxide and silicon oxides, and with the addition of vitrification catalysts, such as magnesium compound or oxide in amounts varying from 1% to 5%, and an alkali metal compound or nitrate in amounts varying from 0.1% to 2%, be fired at a temperature of 1300° C. to 1500° C. to produce a ceramic. If desired, it is also possible to incorporate purified alumina or bauxite devoid of iron, titanium and silicon oxides, in amounts varying from 10% to 50% or more with the normal bauxite, before or after heating to a temperature of 500° C. to 600° C.

It is also desirable in the present invention that the bauxite be submitted to two distinct heating processes, one of dehydration at a red heat of about 500° C. to 600° C. and a second of calcination or firing at a bright yellow heat ranging from 1300° C. to 1600° C., with an intermediate ceramic-forming molding operation.

An advantage of heating the bauxite to dehydrate it at a low temperature of say 500° C. to 600° C. is to preserve the plasticity of the bauxite. If the bauxite is heated to a higher temperature to dehydrate it the particles sinter together and become very hard, and before this dehydrated bauxite may be worked in a pug mill it would have to be ground very fine and the abrasive effect would be such as to rapidly wear the pug mill parts or other compounding devices. By heating to between 500° C. and 600° C. the bauxite remains fine and soft and possesses plasticity enough to be extruded from a pug mill, whereas, if heated to a higher temperature the bauxite loses its plasticity, is very abrasive, and in order to pug the same a binder, such as clay, would have to be incorporated instead of simply mixing with water. In addition, such plastic bauxite appears to be most satisfactorily converted into a vitric-like ceramic at firing temperatures of 1300° C. to 1500° C.

It is most important during this entire procedure that the amorphous character of the alumina be maintained with suitable control of time and temperature. Moreover, the temperature should not be more than 1600° C. in the final step, inasmuch as an increased temperature often produces blistering and gas pockets, thereby decreasing the homogeneous and dense character of the refractory.

The firing operation may be carried out in an oxidizing atmosphere containing air, in a neutral atmosphere containing waste gases, or in a reducing atmosphere containing substantial quantities of hydrogen and carbon monoxide or other reducing gases. Firing in an oxidizing atmosphere appears to give a harder ceramic than firing in a reducing atmosphere, and firing in a reducing atmosphere appears to give a harder ceramic than firing in a neutral atmosphere. If desired, the final firing operation at 1300° C. to 1600° C. may be performed under such circumstances that the iron or titanium in the alumina may be converted into a suitable oxide to give a black or reddish color to the ceramic. These color effects may also be obtained by incorporating vanadium, chromium or manganese compounds in the bauxite before or after dehydration, these compounds being ground in at the same time as the catalysts, but in amounts never exceeding a few percent.

In the accompanying drawing there is illustrated a flow sheet diagrammatically showing the various steps employed in preparing the bauxite ceramic.

Although the bauxite may be ground before step 1, it is found suitable for many purposes to feed the raw bauxite in its conglomerated or pisolitic condition into the funnel 10 which feeds it into a revolving or rotary furnace 11, which may be of the "Ruggles-Cole" type. During the passage through this furnace the bauxite is dehydrated by being heated to a temperature of 500° C. to 600° C. by the burner 9. The dehydrated bauxite is then ground in step 2 in a pebble mill 12 containing flint pebbles, or in a ball or tube mill, and it has been found most satisfactory to carry out this grinding with water. During this grinding operation the vitrifying catalyst or alkaline metal compound, whether it be a magnesium, potassium, or sodium compound, is incorporated in the bauxite. This incorporation may, of course, also take place at other points in the process.

After grinding, the material is passed through the filter press 13 of step 3, where the slurry or liquid mass is separated and the cake 14 of dehydrated bauxite combined with the vitrifying catalyst is obtained as indicated at step 4. This cake is almost dry, but contains about 8% to 10% of water. The cakes are then inserted in a pug mill which may be provided with knives 16 to cut up the filter cake 14, and finally the material is picked up by an auger or Archimedes screw 17 which presses out the same through dies 18 to form a cylinder 19 which may be cut into a series of short sections 20. The extruded mass 20 may be pressed into a die or formed in a forming machine or in a jigger lathe or other fashion to produce articles as above described, which articles are then fired at a temperature of 1300° C. to 1500° C. The extruded mass at 19 finally has the consistency of a thick dough and is termed a wad or stiff mud.

The pug mill 15 may be of the type manufactured by the Ceramic Machine Company, or of the type known as the F-R-H Vacuum Pottery Pug Mills, manufactured by the Fate-Root-Heath Company. In these pug mills, pressure and/or vacuum may be applied to draw out the air from the mass so that the extruded substance 19 is substantially devoid of the air bubbles. This will result in a denser and more homogeneous aluminous ceramic.

Steps 7, 8 and 9 indicate an alternative procedure where the cut sections 20 are dried by the heater 21 and then thrown into a bin 22. From the bin 22 the sections are taken and piled in stacks, as indicated at 23, in the kiln 24 where they are subjected to temperatures of 1300° C. to 1500° C. The fired material may then be crushed by the crushing rolls 25 to form the crushed ceramic 26 which is received in the container 27. Finally the crushed material 26 is screened by the screen 28 to form particles at 29 which may be used for abrasive purposes or in other manners.

By the expression "alkaline metal compound" is included magnesium, potassium, and sodium compounds, of which the oxide or oxygen compounds such as the oxides or the hydroxides, the borates and the nitrates are preferred. Next to these compounds the other compounds which readily decompose with the production of a volatile oxide and an oxide of magnesium, potassium or sodium are preferred, such as the carbonates, sulphates, nitrites, and various organic compounds such as the acetates. Less preferred are the halides such as the chlorides, and least preferred, and usually to be excluded, are the silicates. Alkaline earth metal compounds, such as those of calcium, barium and strontium are also preferably excluded.

Small amounts of silica, or of titanium oxide or of iron oxide may sometimes be added as such or in the form of silicates or titanates to soften the ceramic or retard vitrification.

Although it is preferred to combine the vitrification catalyst in aqueous solution with the bauxite after ignition and during wet grinding, it is also possible to add the catalyst as a dry material to a dry grinding process, or to add the vitrification catalyst as such or in aqueous solution during the pugging operation. The catalyst may also be added in dry condition or in aqueous solution or in a slurry in part during grinding and in part during the pugging operation.

After firing the bauxite may be ground, sifted and molded or formed with or without the addition of water to form articles which may again be ceramically fired.

The employment of alumina devoid of iron, silicon and titanium oxides for ceramics is more fully covered in my co-pending application Serial No. 684,760, filed August 11, 1933; of bauxite without vitrifying catalysts in my co-pending application Serial No. 87,824, filed June 29, 1936; and of bauxite with alkali metal compounds as vitrifying catalysts in my co-pending application Serial No. 87,826, filed June 29, 1936.

It is apparent that many changes could be effected in the processes and procedures above described, and in the specific details thereof, without substantially departing from the invention intended to be defined in the claims, the specific description herein merely serving to illustrate certain elements by which, in one embodiment, the spirit of the invention may be effectuated.

What I claim is:

1. A process of producing an unfused, vitric-like, dense, non-porous, amorphous, formed and fired article of the mineral bauxite which comprises preparing an amorphous, dehydrated bauxite by dehydrating said bauxite at a temperature below 1000° C., forming a mixture of amorphous, dehydrated bauxite with a small percentage of a water soluble magnesium compound, an alkali metal compound and water, wet grinding in a pebble mill, mixing or pugging the mixture, forming said mass into the form of an article desired, and firing said article to a temperature of between 1300° C. and 1450° C.

2. A process of producing an unfused, vitreous, dense, non-porous, amorphous, formed and fired article of the mineral bauxite comprising calcining the bauxite at a temperature between about 500° C. and 600° C., mixing and compounding bauxite with an aqueous solution of magnesium compound and an alkali metal compound, wet grinding in a pebble mill, evaporating the water and pressing the dried powder into the desired article, and firing said article to 1300° C. to 1450° C.

3. The process of forming a vitrified, amorphous, hard, dense, non-porous, non-fused, fired bauxite ceramic containing a vitrification catalyst, which comprises dehydrating bauxite at a temperature between about 500° C. and 600° C., mixing a small percentage of an alkaline metal compound and a magnesium compound with the dehydrated bauxite, wet grinding the mixture in a pebble mill, compressing said mixture into the form of an article desired, and heating said article to a temperature which is below the fusion point of the mixture.

4. A process of making a vitreous, amorphous, hard, bauxite ceramic consisting in calcining bauxite at a temperature below 1000° C. and between about 500° C. and 600° C. to dehydrate it without changing its amorphous character, wet grinding and compounding with the dehydrated bauxite a small percentage of an alkaline metal compound and a magnesium compound, forming to shape under pressure to render the same dense, and firing said dense shape or form at temperatures below the fusion point of the bauxite.

5. The process of making a vitreous bauxite ceramic consisting in calcining bauxite at a temperature below 1000° C. and between about 500° C. and 600° C. to dehydrate it without changing its amorphous character, thoroughly incorporating and wet grinding a small percentage of an alkaline metal compound and a magnesium compound with the calcined bauxite, rendering the mixture dense by pressing it into any desirable form or shape, and firing said dense forms or shapes at a temperature of approximately 1300° C. to 1450° C.

6. The process of making a homogeneous, vitreous-like, non-porous, amorphous article from a natural mineral containing alumina such as bauxite, which comprises calcining bauxite at a temperature below 1000° C. and between about 500° C. and 600° C. to dehydrate it without changing its amorphous character, mixing a small percentage of an alkaline metal compound and a magnesium compound with the calcined bauxite, wet grinding in a pebble mill, forming into articles under pressure, and firing at temperatures above 1000° C. and below the melting point of bauxite.

7. The method of producing a dense, vitreous, amorphous, non-porous bauxite article comprising calcining bauxite at a temperature below 1000° C. and between about 500° C. and 600° C. to dehydrate it without changing its amorphous character, mixing the calcined bauxite with a water soluble alkaline metal compound and a magnesium compound which has the property of being decomposed by heat and forming an alkaline metal oxide, wet grinding in a pebble mill forming the mixture into an article and firing said article in a fuel-fired furnace or kiln.

8. The process of making a synthetic, amorphous, corundum article from bauxite, which comprises calcining bauxite at a temperature of 500° C. to 600° C., then mixing an alkaline metal compound and a magnesium compound in amounts of from 1% to 10% with dehydrated bauxite, wet grinding in a pebble mill, forming an article from said mixture, and firing said article in a fuel-fired kiln.

9. A process of producing ceramics from bauxite which comprises calcining the bauxite at a red heat and at a temperature substantially below 1000° C. and insufficient to destroy its amorphous condition, wet grinding it with the addition of a vitrification catalyst consisting of magnesium and alkali metal compounds, and then forming and firing.

JOHN ALLEN HEANY.